United States Patent [19]

Barnes

[11] Patent Number: 4,528,119

[45] Date of Patent: Jul. 9, 1985

[54] METAL BORIDES, CARBIDES, NITRIDES, SILICIDES, OXIDE MATERIALS AND THEIR METHOD OF PREPARATION

[75] Inventor: Albert L. Barnes, Wickliffe, Ohio

[73] Assignee: Eltech Systems Corporation, Boca Raton, Fla.

[21] Appl. No.: 625,595

[22] Filed: Jun. 28, 1984

[51] Int. Cl.$^3$ .................. H01B 1/04; H01B 1/08; C01G 1/02; C01G 23/04

[52] U.S. Cl. .................... 252/503; 252/502; 252/506; 252/507; 252/508; 252/509; 423/297; 423/344; 423/406; 423/411; 423/412; 423/598; 423/608; 423/612; 423/659; 427/215; 427/443.2; 427/445; 501/94; 501/96

[58] Field of Search ............... 252/502, 503, 506, 507, 252/508, 509; 423/297, 344, 406, 411, 412, 598, 608, 612, 659; 427/215, 443.2, 445; 501/94, 96

[56] References Cited

U.S. PATENT DOCUMENTS

| | | | |
|---|---|---|---|
| 3,649,314 | 3/1972 | James | 252/506 |
| 3,723,601 | 3/1973 | Svanstrom | 423/297 |
| 3,791,808 | 2/1974 | Thomas | 65/30 |
| 4,010,242 | 3/1977 | Iler et al. | 423/608 |
| 4,292,619 | 9/1981 | Mutsaers et al. | 252/518 |

FOREIGN PATENT DOCUMENTS 1004585  9/1965  United Kingdom .
1367763  9/1974  United Kingdom .

OTHER PUBLICATIONS

"Fabrication and Characterization of SiC-AlN Alloys" Journal of Materials Science, vol. 16, pp. 3479-3488.
"Preparation of Glasses and Ceramics from Metal-Organic Compounds" by B. E. Yoldas, Journal of Materials Science, 12 (1977), pp. 1203 et seq.
"Thermal Decomposition of Spherical Hydrated Basic Aluminum Sulfate", Ceramic Bulletin, vol. 63, No. 2, pp. 301-309.
"Formation, Packing, and Sintering of Monodisperse $TiO_2$ Powders" Comm's. of the Am. Ceramic Soc. Dec. 1982, pp. C-199 to C-201.

Primary Examiner—Paul Lieberman
Assistant Examiner—Robert A. Wax
Attorney, Agent, or Firm—John J. Freer

[57] ABSTRACT

Precursors, particularly of non-oxide ceramics, are prepared by special seeding, under carefully controlled conditions. Such procedures can lead to the preparation of unique powders, which may be useful, for example as abrasives, or further processed in special manner to prepare a variety of metal substances. Such procedures can permit final firing to sintered product.

30 Claims, No Drawings

METAL BORIDES, CARBIDES, NITRIDES, SILICIDES, OXIDE MATERIALS AND THEIR METHOD OF PREPARATION

BACKGROUND OF THE INVENTION

Recently, aspects of colloidal chemistry have been investigated as a starting point for eventually preparing ceramic materials. For example, spherical particles of hydrated basic aluminum sulfate have been formed by a precipitation process utilizing the urea decomposition reaction in aqueous medium. The particles as discussed in "Thermal Decomposition of Spherical Hydrated Basic Aluminum Sulfate" Ceramic Bulletin, Volume 63, No. 2, Pages 301-309, can be calcined to form finely divided particles of aluminum oxide.

In related investigations, monodispersed titanium dioxide powders have been synthesized by the controlled hydrolysis of dilute alcoholic solutions of titanium alkoxides. Thus, as discussed in "Formation, Packing, and Sintering of Monodispersed $TiO_2$ Powders", Communications of the American Ceramic Society, December 1982, Pages C-199 to C-201, a dilute alcoholic solution such as containing titanium tetraethoxide, by use of special mixing technique, can be used to prepare a very finely divided precipitate. By use of such colloidal chemistry techniques attempts are being made to prepare ideally sinterable powders to produce theoretically dense single-phase ceramics, the powders being of a narrow size distribution and in a non-agglomerated state.

Considering for a moment materials other than oxides, the refractory metal borides, carbides and nitrides have already been discussed for use as components of electrolytic aluminum production cells. Moreover, in the production of such materials, solutions of alcoholic titanium have been suggested as useful. Thus in U.S. patent application Ser. No. 454,718 it has been proposed to initially formulate solutions of a titanium alkoxide plus soluble borate together with a soluble carbon source, such as sugar, as reducing agent. By starting with a combination of ingredients in this manner, and by use of subsequent carefully controlled processing techniques, a finally sintered product of desirable density and purity may be achieved.

It has also been proposed to prepare carbide and nitride alloys, through the carbothermal reduction technique, using inorganic reagents of the metals. Thus in "Fabrication and Characterization of SiC-AlN Alloys", Journal of Material Science, Volume 16, Pages 3479-3488, there has been disclosed the preparation of an aqueous solution of an aluminum chloride in conjunction with a starch dispersion. After the addition of finely divided silica, pH adjustment with ammonia leads to aluminum hydroxide precipitation. The precipitate can be dried and calcined to yield an SiC-AlN ceramic alloy powder.

Considering again the preparation of borides, as well as carbides and nitrides by carbothermal reduction, wherein the use of carbon particulates have been employed, it has been suggested that such can be useful when pressed together with other ingredients. Thus in British Pat. No. 1,004,585, there is disclosed an intimate mixture of boric oxide and titanium dioxide, which includes in the mixture particulate carbon such as graphite, thoroughly blended together, then compressed and sintered. A friable powder prepared by such process can be expected to contain a high yield of titanium diboride.

Thus a variety of reactions and approaches are being made to prepare useful substances for the ceramic industry. Unfortunately, some techniques although providing promise in regard to uniformity and purity of materials have proven to be too expensive and inefficient to be practical. Other, more practical developments in economy of processing, nevertheless rely on expensive ingredients that detract from the overall desirability of the technique.

SUMMARY OF THE INVENTION

It would thus be most highly desirable to prepare highly pure and consolidated final ceramic and refractory materials using not only economy of processing but also of ingredients. Moreover, the reaction sequence should provide finally sintered materials of desirable microstructure and high density.

It has now been found that highly pure and desirably consolidated compounds can be produced by taking advantage of readily available and inexpensive ingredients. Moreover, an economy in processing is provided by the present invention. Products of a highly desirable microstructure can be achieved combined with product densities leading to extended use, even under severe conditions.

In brief, the present invention may be initiated by a method for producing a metal oxide in combination with reducing agent for the oxide wherein a solution of a soluble, non-oxide substance of the metal is prepared in liquid medium, and thereafter pH adjustment is used to precipitate metal oxide. More particularly, the present invention comprises seeding the solution with solid and insoluble, ultrafine carbon particulates that maintain their solid integrity in the resulting dispersion. This seeded dispersion is agitated and as agitation continues, there is a gradual adjusting of the pH of liquid medium by bringing the liquid medium in contact with organic, carbon-containing substance yielding hydroxyl ions in aqueous medium at elevated temperature. Then the medium is established at sufficiently elevated temperature to yield hydroxyl ions, thereby permitting formation of hydrous metal oxide crystals with the ultrafine particulate carbon seeds in the dispersion.

In another aspect, the invention is directed to a dry, solid and free-flowing gray pigmentary particulate of substantially uniformly sized particles having particle size not above about 0.5 micron and comprising crystals of hydrous metal oxide nucleated with a metal oxide reducing agent of solid, ultrafine carbon particulate seeds. In another important aspect, the invention is directed to a method for making a metal carbide or nitride abrasive powder.

Still another aspect of the invention includes the method of making a metal silicide of high purity. Moreover the invention is directed to the method of making a metal boride of high purity in a process utilizing carbon-nucleated titanium oxide crystals which are admixed with boron-containing substance and calcined before further reaction and subsequent sintering.

DESCRIPTION OF THE PREFERRED EMBODIMENTS

The articles often produced by the present invention are the refractory metal borides, carbides, nitrides and mixtures, combinations and cermets thereof. These are most typically the borides, carbides and nitrides of the Group IVb metals titanium, zirconium and hafnium, Group Vb metals vanadium, niobium and tantalum, and VIb metals chromium, molybdenum and tungsten. However, it is to be understood that other metals, e.g., aluminum, as well as other compounds, such as silicides, are contemplated and will be discussed herein. Mixtures and combinations include physical mixtures, e.g., physical mixtures of titanium and zirconium boride, or mixtures produced in two discrete phases such as the simultaneous production of a boride and a nitride or titanium boride plus titanium carbide. Moreover such mixtures and combinations can include the production of single complex phases, e.g., a borocarbide or boronitride. Furthermore such mixtures can include composites such as $TiB_2/AlN$. The cermets can be formed, for example, by preparing porous composite bodies of the refractory articles and then infiltrating them with other metals or alloys.

In the production of these refractory metal compounds there can be used the metal oxide reduction method. In the reduction method while the metal is being reduced it is often reacting in reduced condition with additional substance. For example, titanium dioxide reduced with carbon reacting with boron to form $TiB_2$. For purposes of convenience, the "reactant" for combination with the metal, as the term is used herein, is meant the substance reacted with such metal in the desired product, e.g., boride reactant to prepare titanium boride.

For initiating reaction, in general an aqueous medium containing a non-oxide substance of the metal in solution is prepared. The solution can contain for example the sulfate or halide of the metal, for example, titanium tetrachloride, although other oxyanions, e.g., nitrates are contemplated. The solution will most always be subjected to agitation and as such proceeds, there will be admixed with the solution the ultrafine, particulate carbon. The ultrafine carbon particulate should be of high purity so as not to introduce impurities into the mixture. Ultrafine carbon particulates which are commercially available are generally of sufficient purity to be serviceable, most often having volatiles of less than six weight percent, and many have a volatile content of only two weight percent or even less. For providing intimate contact during later elevated temperature reaction, it is critical that the average particle size of the carbon particulates be below about 0.1 micron and such average size can be expected to be above 0.01 micron. Preferably such particulates have an average particle size of between about 0.015 micron and about 0.06 micron. Such particulate carbon can be readily dispersed in the solution containing the metal by continuing the agitation, to prepare a resulting dispersion. In the dispersion such particulates need to be insoluble and retain their particulate, solid integrity to serve as seeds for the hydrous metal oxide crystals. In actual practice, even under severe conditions, retention of particulate integrity has been maintained, such as under condition of dispersion pH on the order of 0.1 or so. Suitable sources of the ultrafine carbon particulates that will maintain their particulate integrity in the dispersion include furnace blacks, channel blacks, lampblacks and acetylene blacks. Although it is desirable to at least approximate stoichiometric proportions, other parameters can be useful, such as on the order of about 50 percent of the carbon needed for stoichiometry, as determined by the reduction method, to even the employment of a slight excess over stoichiometric.

It is to be understood that systems other than those relying on an aqueous medium are contemplated. Thus a titanium tetrachloride solution in carbon tetrachloride and containing the ultrafine carbon particulates in dispersion can be useful. Aqueous hydroxyl-ion-supplying composition, as more particularly discussed hereinbelow, can be blended with such organic solutions to form the initially desired precursor material. The carbon tetrachloride can simply be decanted to substantially separate the desired material as a precipitate.

Considering again the dispersion in aqueous medium, the pH can now be adjusted through the use of organic, carbon-containing precursor substance yielding hydroxyl ions in aqueous medium. The gradual introduction of hydroxyl ions at this stage, without the commensurate introduction of undesired contaminants, e.g., undesired cations, is critical, together with uniform introduction of such hydroxyl ions. To accomplish this, an organic carbon-containing precursor substance, typically one reacting with water at elevated temperature will be useful. Exemplary of such precursor substances are urea and amines. By way of example, urea reacts with water above about 70° C. to form ammonium ions, hydroxyl ions and carbon dioxide. In this manner, the introduction of hydroxyl ions is gradual and uniform. Such uniformity is enhanced by continuing agitation of the dispersion during introduction of the organic precursor substance. Additionally, such addition will most always be accompanied by heating. The heating is preferably carefully controlled to assist in a gradual and uniform introduction of hydroxyl ions in the solution. By such technique, the pH of the dispersion will change, typically approaching, and maybe even surpassing, neutrality, although a final pH within the range of from about 4.5 to about 6 will usually be reached. As such pH change is taking place there will gradually be forming a precipitate of crystals of hydrous metallic oxide nucleated by the particulate ultrafine carbon particles. As hydrolysis is completed, the mixing of ultrafine carbon seeds and the hydrous metallic oxide will be accomplished on a microscopic scale providing final particulates typically having size less than 0.5 micron and average particle size typically of about 0.2 micron. Where a metallic sulfate has been used initially, particles of hydrated basic metallic sulfate can be expected to be included in the precipitate.

The resulting precipitate can be separated from the supernatant liquid, such as by decantation or centrifuging. Other separation techniques may also be used, e.g., filtration including pressure filtration. During such separation the precipitate is typically cooling and thereafter it is usually washed, thereby assisting in the cooling and removal of residual materials, e.g., ammonium chloride where a metal chloride has initially been used.

After separation, the precipitate is generally dried although under some circumstances a distinct drying step will not be necessary. For example, where a particulate carbon has been used as seed for hydrous titanium oxide, and titanium carbide abrasive powder is the desired product, the material after separation can proceed directly to a heating step, which will understandably include initial drying of the material during the heating. Also, drying may not be directly involved after separation where the separated precipitate may be blended with further ingredients in wet condition. For example, a carbon-nucleated hydrous titanic oxide precipitate could be blended with a solution of boric acid. Usually such technique will not be preferred as such blending will necessarily be followed by a more uneconomical drying operation. Thus where blending operation is to be used, it is preferred for economy to dry the separated precipitate and then blend same with dry reactant. By way of illustration it is preferable to blend a dry boric acid with a material dried after separation such as carbon-nucleated hydrous titanic oxide precipitate. It is thus to be understood that the dried and separated material is dried in the sense of being typically a free flowing particulate material which can include water of hydration. Simple elevated temperature drying, such as at a temperature of about 100° C., for a period of several hours, e.g., 6–20 hours, will be usually sufficient to prepare a dry, free-flowing particulate from the separated material, i.e., a finely divided material feeling dry to the touch. Such solid particulate, sometimes referred to herein for convenience as the "pigmentary" particulate, will typically have gray appearance contributed by the carbon seeds and can find utility from its gray, pigmentary characteristic as well as being useful in the further processing discussed hereinbelow. Other procedures for drying, e.g., forced air drying, can be used for producing the finely divided material. The pigmentary particulate will be observed to have substantially uniformly sized particles, and in part owing to the use of the ultrafine carbon particulate seeds will usually have an average particle size of not above about 0.5 micron.

This particulate can then be blended with other substances, and such substances may include reactant. For example, boric acid can be blended with a carbon-nucleated hydrous titanic oxide precipitate, for subsequent preparation of titanium diboride; or, molybdenum oxide may be blended with a carbon-nucleated hydrous silicon oxide precipitate, where subsequent molybdenum silicide is contemplated, as will be more fully discussed hereinbelow. Also, constituent adjustments may now be made. It is desirable for most economical operation that inorganic substances be used. Thus for boosting carbon content of the material, a small amount of the ultrafine carbon can be useful. It is however, contemplated that organic materials, e.g., sucrose and ethylene glycol will be suitable for adjusting the separated precipitate. It is to be understood that ingredients other than reactant and constituent adjustments may be added. For example, in a subsequent aluminothermic or carboaluminothermic reaction it would be acceptable to add aluminum or aluminum containing compound to the separated precipitate.

The addition of all such materials can be made by any method known to those skilled in the art suitable for preparing well blended mixtures of ingredients. Where a drying step has been employed with the precipitate, subsequent blending can be by any method known in the art for combining dry ingredients, e.g., twin shell mixing of a dry precipitate with a dry reactant such as molybdenum dioxide. Where the separated precipitate has not been dried, any of the known methods of wet blending may be useful. And where an insoluble reactant is to be admixed with a precipitate, a wet mixing or wet milling operation can provide a desirable mixed product. Wet blending can include addition of substances dissolved or suspended in solvents and the solvents can be made fugitive during the blending operation. It is furthermore contemplated that binders might be useful and ingredient additions can be accomplished by being included in such binder materials. For use as binders those materials known in the art are suitable such as the usual waxes and organic liquids. The binder itself may be dissolved in a solvent to assist in preparing a uniform dispersion of ingredients. The solvent can be volatilized during mixing operation.

The resulting blend, prepared by any of the above-discussed methods, may then be pressed and thereafter, or without pressing, proceeds to a calcining step. Uncalcined particles can be expected to contain significant amounts of water of hydration. Calcining will remove this water. The blend will also proceed through dehydroxylization and where a sulfate metal salt has been used, there will be desulfurization. The calcining is carried on at a temperature lower than for providing the carbothermic reaction that will take place subsequently during the reaction, if procedures are carried that far. The calcining can proceed most always at normal pressure and under an atmosphere of a non-interfering gas such as argon. Where a nitride will be the desired product, such as nitride abrasive powder, a nitrogen atmosphere would be typically employed. For the calcining, temperatures as moderate as about 250° C. to about 350° C., or as elevated as on the order of from about 600° C. to about 900° C., may be used during the calcining step. Since the aforedescribed microscopically intimate mixing through ultrafine carbon nucleation has resulted in a highly reactive material, it is preferred that the calcining be carried on at a temperature at least about 200° C., and preferably at about 300° C. or so, lower than the subsequent sintering temperature in the reaction sintering step. Following calcining there will be produced a particulate of dehydroxylized crystals with most always a gray cast from the presence of the carbon seeds. Such can be useful, e.g., for special pigmentation purposes. In the particular case where a boron reactant has been used with a carbon-nucleated hydrous titanic oxide precipitate, calcining will prepare a gray particulate of substantially uniform sized particles with at least essentially all particles passing 100 mesh (U.S. Sieve Series).

Before proceeding, certain terms as used hereinafter will be briefly mentioned. A "precursor material" is the particulate material resulting from the calcining operation. The precursor material can then proceed through a two-stage process. The first stage is referred to for convenience as a "first" reaction step. This step is carried out at elevated temperature, but always at substantially less than normal sintering temperature. After this, the more elevated temperature second stage will be referred to as the "sintering step". As will be understood by those skilled in the art, the reaction step may be combined with the sintering step in an actual, single-stage elevated temperature operation. Such optional procedure will be more fully discussed hereinbelow.

At this juncture another opportunity is presented for constituent adjustments. As discussed hereinbefore, for most economical operation, inorganic substances will be used. Also, another opportunity is presented for the addition of, e.g., aluminum for a subsequent aluminothermic reaction. The addition of such materials can be made by the methods as discussed hereinabove, such as by the use of binders with ingredient additions being accomplished by being included in such binder materials.

After the adjustments and typically a blending operation, the resulting mixture is then generally pressed which may be by roller pressing or dry pressing in a mold or isostatic pressing, or cold pressing and heating or hot pressing. This produces a body of the mixture for further reaction by heating. Other operations, e.g., machining or drilling of the resultant shaped product may be employed before heating. At this stage of the process, when the powder is pressed into a shaped article, the presence of a binder is optional. A typical pressure for the pressing can be within the range of from about 0.5 KPSI to about 20 KPSI, and most usually from about 0.5 KPSI to 2 KPSI for ease of operation.

After pressing the material is ready for heating. This heating step is the "reaction step", which term has been mentioned hereinbefore. In this step, the material is generally first heated for a brief time at a reduced temperature, for example from about 200°–400° C., e.g., to permit low temperature drying. When the process is a carbothermic reduction, it will be typical before heating to first load the article in a carbon or graphite crucible. Even during the initial low temperature heating, it is preferred that this reaction step process proceed under reduced pressure to facilitate evacuation of trapped gasses. Low pressure is maintained as heating continues such that the step is carried out at a vacuum within the range of from about 1 millitorr to about 5,000 millitorrs, and more typically, for efficient evacuation of gas coupled with economy of operation, at a reduced pressure within the range of from on the order of about 50 millitorrs to about 1,000 millitorrs.

As this reaction step is continued, the temperature is increased but is always maintained substantially less than normal sintering temperature. In the specific case for the production of a compound such as titanium diboride, the brief, initial heating at a reduced temperature can be followed by a relatively fast temperature increase to about 1100° C. The heating rate may be reduced such that the shaped article is heated in this first reaction step to a temperature maximum within the range of from about 1100° C. to about 1400° C. For comparison, a usual temperature for initiating the reaction for such titanium diboride can be expected to be on the order of about 1500° C. or more. At the upper, attained temperature level in this reaction step, the shaped articles are allowed to remain at temperature for a time period sufficient to complete at least substantial reaction. It is advantageous for economy of operation that this reaction proceed virtually to completion, e.g., to above 95 percent and more usually to 99 percent or so. For a product where off-gasses will be produced as reaction progresses, the progress of the reaction can be monitored by plotting temperature and pressure against time. Thus, when it is observed that the pressure begins to substantially decrease, a clear indication is signaled that the reaction is approaching completion. The heating can be maintained for a while longer or terminated to end this reaction step and the product is permitted to cool.

If the resulting material crumbles easily, it need not be comminuted, otherwise such operation is generally in order. Since sintering has not as yet occurred, constituent adjustments, or often constituent additions, can again be made to the product, as will be discussed more particularly hereinbelow. If it is deemed that no adjustments or additions are in order, the pulverulent product may then be processed. For this processing a pressing operation using a binder such as camphor, polyethylene glycol or paraffin wax can be advantageous to insure structural integrity and thus a form-stable condition of the shaped article during the subsequent sintering step. However, all the usual forming methods are contemplated, e.g., slip casting and molding procedures. The shaped article can be machined to obtain desired shape or geometry. For example, holes may be drilled into the article to obtain a honeycomb structure.

The sintering step then proceeds under reduced pressure and at sintering temperature, and most desirable with an established sintering aid atmosphere. By this it is meant that the atmosphere around the shaped article contains sintering aid ingredient in the vapor phase. To produce the appropriate atmosphere of activating agent, or "sintering aid", such may be provided by addition of materials directly or by reaction. In the particular case of preparing titanium diboride, boron carbide, or boron nitride, or both can serve as sintering aid. The boron nitride may be present as a particulate material, and in such form it can be incorporated with other reaction ingredients. Thus it can be pressed with such ingredients into a compact for sintering. Or the loose particulate will be serviceable when present adjacent the compact. Boron nitride in a dual role may serve not only as an assistant in reaction sintering, but also as a reaction participant, as in the preparation of composites, such as those combining aluminum nitride with refractory metal compounds, as will be discussed further hereinbelow. At even the reduced pressure of the reaction sintering the boron carbide or boron nitride will have a finite vapor pressure that will establish a sintering aid atmosphere. For the preparation of an exemplary titanium diboride product, other materials useful for establishing this sintering aid atmosphere by reaction could be elemental boron, active carbon, or carbonitrides of titanium, as examples of other sources for boron and carbon vapors.

To achieve the sintering, the heating will be initiated gradually, especially where binder has been used, to accommodate binder burnoff. When this has been accomplished, and as heating is continued under reduced pressure, a quite rapid temperature increase can be permitted. Thus in the case of the preparation of titanium diboride, the shaped article might be heated from a temperature of about 500° C. to over 2000° C. in a time of from as short as about 0.5 hour to as long as about 2 hours. Continuing with this specific embodiment, such titanium diboride can then be maintained at a sintering temperature, generally within the range of from 2000° C. to not above about 2300° C. For added economy, it is more advantageously maintained at a temperature within the range of from about 2000° C. to about 2100° C., for a time of from about 1 hour to about 4 hours. Sintering times of less than about 1 hour for the particular titanium diboride can result in insufficient consolidation. If sintering times exceed more than about 4 hours unwanted contaminants from surrounding materials may be aggregated with the desired product. At the end of the sintering operation, the resulting sintered product is permitted to cool and can then be separated from any adhering materials, e.g., a surrounding pulverulent sintering aid material. Such material can generally be removed from the product either by surface grinding or brushing. The foregoing discussion on heating has been presented as a two-step procedure, going first to a reaction step and then to a sintering step. This is the preferred procedure for purposes of flexibility in adjusting reactants and to produce the most pure, consolidated material. It is, however, to be understood that a one-step heating procedure may be used. In general, the above-discussed reaction step would be employed, and from there the process would proceed directly to the more elevated temperature sintering, but being careful that the other sintering step features, such as sintering aid temperature, are utilized.

As mentioned briefly hereinbefore, in the two-step heating sequence, the precursor powder, before the reaction step, may be blended with additional reactants or substances and then further heat processed. By way of an example in more detail, in the specific case of obtaining a $TiB_2/AlN$ composite, the AlN can be admixed with the precursor powder prior to the firing step. Alternatively, boron nitride and metallic aluminum can be added separately, to form the metallic aluminum nitride in situ.

In the formation of the $TiB_2/AlN$ composite, it is also contemplated that the processing for preparing such materials can be initiated with the carbon seeding of the aqueous medium containing metal in solution. In this processing, particulate metal and more specifically particulate aluminum for the illustrative composite, is present as a seeding ingredient along with the ultrafine carbon. Processing continues as described hereinbefore such that, for example, a carbon-nucleated as well as aluminum-nucleated hydrous titanic oxide precipitate is prepared. This precipitate is then processed in the manner as hereinabove described. There can initially result from this technique a gray pigmentary powder of hydrous metal oxide nucleated with the carbon and aluminum particle seeds. Drying can produce a free-flowing particulate, dry to the touch, that will be useful for its electrical and thermally conductive properties as well as for its pigmentary character. It is to be understood that additional pulverulent metal, e.g., aluminum flake or powder, can be blended with this dry particulate. For efficiency, it is preferred that addition of pulverulent metal be initiated at this juncture of the processing for preparing composites. Thus, for efficiency, the metal is blended with hydrous metallic oxide precipitate which is only carbon-nucleated. It is to be understood that other ingredients, e.g., boron nitride may be added at this stage of the preparation method.

The material can then proceed to the calcining operation in the manner as has been discussed hereinabove. After calcining, where particulate metal has been used along with ultrafine carbon in seeding, the calcining will now produce an electrically and thermally conductive particulate which again is contemplated for use on the basis of such properties, as well as for use in the further processing described hereinafter. The particulate will comprise dehydroxylized metal oxide nucleated with the ultrafine carbon plus the particulate metal. Following calcining, a substituent addition stage is again presented. This includes an opportunity for constituent adjustments. Again materials such as particulate aluminum, aluminum nitride, and boron nitride would be considered where processing has been initiated with a titanium metal and a $TiB_2/AlN$ composite is the desired finished product. Processing steps as discussed hereinbefore, are then to be undertaken at this stage for proceeding through to the final preparation of the composite.

It is thus to be appreciated that alternatives to the mere carbothermic reaction for preparation of useful materials are serviceable in the present invention. As outlined hereinabove, one useful alternative procedure is the carboaluminothermic reaction, i.e., reduction with both carbon and aluminum. As an illustration, titanium oxide mixed with boron oxide can be reduced with carbon and aluminum, and if conducted in the presence of a nitrogen atmosphere will produce titanium diboride and aluminum nitride. Also, reacted material can be obtained from direct addition of aluminum nitride to the precursor or by in situ reaction between boron nitride and aluminum.

Ingredients for preparing a composite in the final sintering step can be mixed together before sintering and pressed into a shaped article, typically using a binder as has been discussed in greater detail hereinbefore. The pressed article is then generally brought up to sintering temperature in a manner such as described hereinbefore with respect to sintering, preferably under an argon atmosphere as with the situation of preparing $TiB_2/AlN$ to prevent loss of aluminum nitride. For sintering the $TiB_2/AlN$ composite, a temperature within the range of from about 1800° C. to about 2100° C., maintained for a time of about 2 hours to about 8 hours, will be useful. The resulting shaped article is then allowed to cool and treated as described hereinabove. This specific composite is particularly useful in an aluminum electrowinning process for its known resistance to both aluminum and cryolite.

As briefly mentioned hereinbefore, it can also be desirable to use ultrafine carbon particulates as seeding material in a liquid medium containing silicon in solution. The solution will then be handled in the above-discussed manner to provide a carbon-nucleated hydrous silicon oxide precipitate. Such precipitate is, above-described, to prepare a dry, free-flowing particulate containing carbon-nucleated hydrous silicon oxide. Follow-up processing subsequently prepares a carbon-nucleated particulate comprising crystals of dehydroxylized silicon oxide. Either the initial free-flowing particulate or the dehydroxylized particulate can be mixed with an oxide of a metal, with the metal being selected for preparing by continuing operation a silicide of such metal. After calcining and any substituent adjustments or additions, the composition may then proceed in such manner as discussed hereinbefore, e.g., through binding and pressing operation. Eventually, as a compound production step, the material will be reacted at elevated temperature suitable for preparing the silicide from the metal selected. Metal silicides of particular interest include those prepared from metals such as mentioned hereinbefore, e.g., molybdenum.

The following example shows a way in which the invention has been practiced but should not be construed as limiting the invention.

EXAMPLE

A solution of 496 milliliters of aqueous titanium tetrachloride was prepared in 2500 milliliters of deionized water. With constant stirring, there was added to this solution, 87 grams of an ultrafine carbon black which was an acetylene black having an average particle size of 0.04 micron. The resulting dispersion had a pH of about 0.1. As agitation continued, urea addition was initiated. During urea addition, heat was applied. As the pH of the dispersion approached 1.5, and the dispersion temperature approached 100° C., a precipitate started to form. Urea addition was continued until a total of 173 grams of urea had been added. Heating was maintained at 100° C. The resulting dispersion achieved a slightly basic pH.

The precipitate was filtered and air dried for about 16 hours at 110° C. There resulted a gray free-flowing particulate, dry to the touch, containing a hydrous titanium oxide nucleated with the carbon black seeds. All of the material passed through a 50 mesh screen (U.S.S.S.).

A weight of 209 grams of this material was twin shell blended with 267 grams of dry, pulverulent boric acid for one hour. This resulting blend was placed in an alumina crucible, which was put in an Inconel retort that was placed in a crucible furnace. For calcining in the furnace, the mixture was heated for eight hours at 250° C. under a flowing argon atmosphere. After heating, the product was cooled and found to be a gray particulate, which was lightly ground by brushing through a sieve to produce a free-flowing particulate which was observed by visual inspection to be a well mixed blend of the carbon-nucleated titanium oxide in admixture with the boric acid. This material was analyzed by inductively coupled plasma-optical emission spectroscopy technique and found to contain 23.2 weight percent titanium, 22.5 weight percent carbon and 8.6 weight percent boron with a balance presumed to be oxygen and residual water.

More of the above-described acetylene black, along with boric acid, were added to adjust the particulate composition to 19.6 weight percent titanium, 13.2 weight percent boron and 24.8 weight percent carbon. The resulting particulate material was then unioxially pressed at about one KPSI into pellets that were placed in clean carbon crucibles. The pellets were then heated in a vacuum furnace initially at low temperatures in the range of 100°–300° C. until gas evolution subsided, then they were heated to 1100° C. to 1400° C. in eight hours. Initiation of reaction was observed by gas evolution inducing an increase in the reduced pressure when the temperature was in the range of 1100°–1150° C. After reaching 1400° C. arrival toward completion of the reaction was marked by a sudden drop in pressure in about 2–4 hours. However, to ensure a more fulfilling reaction for this stage of the process, the temperature was maintained for 8 hours after which the furnace was allowed to cool down. Generally, pressure was kept below 1000 millitorrs. After the reaction, the pellets were found to have crumbled into a light gray powdery mass. The powder did not need further grinding. X-ray diffraction analysis indicated $TiB_2$ as the only crystalline phase.

The powder was then pressed into a pellet by first mixing with a 4 weight percent dispersion of Carbowax 200 (Union Carbide) dissolved in methylene chloride and then mechanically pressing the resulting mixture at a pressure of 10 KPSI followed by isostatic pressing at 40 KPSI. The pellet was surrounded by boron carbide powder and placed in a carbon crucible covered with a lid. This assembly ensured that the atmosphere could be controlled around the pellet for sintering. The pellet was heated in a temperature range of 100°–300° C. to remove binder and then heated to about 2100° C. in about 1.5 hours. After reaching that temperature, it was maintained for two hours after which the furnace was allowed to cool. Pressure was maintained at less than 1000 millitorr. X-ray diffraction analysis again indicated $TiB_2$ in the crystalline phase.

I claim:

1. The method of making a composition adapted for preparing refractory hard metal boride in a process first combining metal oxide with reducing agent, which method comprises:

establishing a solution of a non-oxide substance of said metal in liquid medium;

seeding said solution with solid and insoluble, ultrafine carbon particulates which maintain solid integrity in the resulting dispersion;

agitating the seeded dispersion;

gradually adjusting the pH of liquid medium, while agitation continues, by bringing said liquid medium in contact with organic, carbon-containing substance yielding hydroxyl ions in aqueous medium at elevated temperature;

establishing said liquid medium at sufficiently elevated temperature to yield said hydroxyl ions;

forming hydrous metal oxide crystals with said ultrafine particulate carbon seeds in said dispersion;

separating the resulting seeded crystals from said dispersion medium;

admixing the resulting separated seeded crystals with boron-containing substance; and calcining the resulting admixture, thereby producing a calcined mixture for preparing hard metal boride by elevated temperature reaction.

2. The method of claim 1, wherein said calcined mixture is reacted and sintered at elevated temperature thereby preparing sintered refractory metal boride product.

3. The method of claim 1, wherein said solution is seeded with said carbon particulates of high purity and having average particle size within the range of from about 0.01 micron to about 0.1 micron.

4. The method of claim 1, wherein there is seeded a solution of a halide salt of said refractory hard metal.

5. The method of claim 1, wherein pH is adjusted by addition of organic, carbon-containing substance yielding ammonia plus hydroxyl ions in aqueous medium at elevated temperature.

6. The method of claim 1, wherein said liquid medium is heated during crystal formation to establish same at sufficiently elevated temperature to yield hydroxyl ions.

7. The method of claim 1, wherein bringing said liquid medium in contact with said organic substance comprises bringing organic liquid medium in contact with aqueous medium containing said organic substance.

8. The method of claim 1, wherein formation of said hydrous metal oxide crystals with said ultrafine particulate carbon seeds precipitates said oxide crystals and seeds from said dispersion.

9. A dry, solid, free-flowing particulate derived from material containing carbon-nucleated hydrous metal oxide, said composition comprising crystals of dehydroxylized metal oxide nucleated with a reducing agent of solid, ultrafine carbon particulate seeds, the seeded crystals being in intimate mixture in the particulate with a reactant for the metal of said metal oxide, which reactant is capable of reacting with said metal when the metal is reduced by carbon.

10. The particulate of claim 9, wherein said crystals are of dehydroxylized titaniun oxide and said reactant is a boron-containing reactant.

11. The particulate of claim 9, wherein said seeded crystals are in intimate mixture with reactant plus pulverulent metal.

12. A dry, solid and free-flowing, electrically and thermally conductive particulate derived from material containing nucleated hydrous metal oxide, said composition comprising crystals of dehydroxylized metal oxide nucleated with seeds of finely divided metal plus seeds of a metal oxide reducing agent of solid, ultrafine carbon particulates, the seeded crystals being in intimate mixture in the particulate with a reactant for the metal of said metal oxide, which reactant is capable of reacting with said metal of the oxide when the metal is reduced by carbon.

13. The particulate of claim 12, wherein said crystals are of dehydroxylized titanium oxide, said reactant is a boron-containing reactant and said finely divided metal includes pulverulent aluminum.

14. In the method for producing a metal oxide in combination with reducing agent for same wherein a solution of a soluble, non-oxide substance of the metal is prepared in liquid medium, and thereafter pH adjustment is used to precipitate metal oxide, the improvement which comprises:
    seeding said solution with solid and insoluble, ultrafine carbon particulates which maintain solid integrity in the resulting dispersion;
    agitating the seeded dispersion;
    gradually adjusting the pH of liquid medium, while agitation continues, by bringing said liquid medium in contact with organic, carbon-containing substance yielding hydroxyl ions in aqueous medium at elevated temperature; and
    establishing said liquid medium at sufficiently elevated temperature to yield said hydroxyl ions; thereby
    forming hydrous metal oxide crystals with said ultrafine particulate carbon seeds in said dispersion.

15. The method of claim 14, wherein said solution is seeded with ultrafine carbon particulates of high purity and having average particle size within the range of from about 0.01 micron to about 0.1 micron.

16. The method of claim 14, wherein there is seeded a solution of a halide salt of said refractory hard metal.

17. The method of claim 14, wherein pH is adjusted by addition of organic, carbon-containing substance yielding ammonia plus hydroxyl ions in aqueous medium at elevated temperature.

18. The method of claim 14, wherein said liquid medium is heated during crystal formation to establish same at sufficient temperature to yield hydroxyl ions.

19. The method of claim 14, wherein bringing said liquid medium in contact with said organic substance comprises bringing organic liquid medium in contact with aqueous medium containing said organic substance.

20. The method of claim 14, wherein formation of said hydrous metal oxide crystals with said ultrafine particulate carbon seeds precipitates said crystals and seeds from said dispersion.

21. The method of claim 14, wherein said solution is seeded with said carbon particulates plus particulate metal.

22. The method of claim 21, wherein formation of said hydrous metal oxide crystals with said carbon seeds plus particulate metal seeds precipitates said crystals and seeds from said dispersion.

23. The method of claim 21, wherein said precipitate is separated from supernatant liquid.

24. The method of claim 23, wherein said precipitate is separated by filtration and further said precipitate is cooled and dried.

25. A dry, solid and free-flowing, electrically and thermally conductive gray particulate comprising crystals of hydrous metal oxide nucleated with seeds of finely divided metal plus seeds of a metal oxide reducing agent of solid, ultrafine carbon particles.

26. The method for preparing a metal oxide in combination with reducing agent for same, the combination being adapted for reduction of said metal oxide, which method comprises:
    establishing a solution of a soluble, non-oxide of the metal in liquid medium;
    seeding said solution with solid and insoluble, ultrafine carbon paticulates, which maintain solid integrity in the resulting dispersion, in an amount substantially less than stoichiometric for reduction of said metal oxide;
    gradually adjusting the pH of liquid medium, while agitation continues, by bringing said liquid medium in contact with substance yielding hydroxyl ions in aqueous medium at elevated temperature;
    establishing said liquid medium at sufficiently elevated temperature to yield said hydroxyl ions;
    forming hydrous metal oxide crystals with said ultrafine particulate carbons seeds in said dispersion;
    separating the resulting seeded crystals from said dispersion medium; and
    admixing the resulting separated seeded crystals with additional ultrafine carbon particulates in an amount sufficient to provide a total of said particulates greater than stoichiometric for reduction of said metal oxide.

27. The method of claim 26, wherein reactant is admixed to the seeded crystals along with said additional carbon particulates.

28. The method of making a composition adapted for preparing a metal silicide in a process combining silicon oxide with reducing agent, which method comprises;
    establishing a solution of a non-oxide of silicon in liquid medium;
    seeding said solution with solid and insoluble, ultrafine carbon particulates which maintain solid integrity in the resulting dispersion;
    agitating the seeded dispersion;
    gradually adjusting the pH of liquid medium, while agitation continues, by bringing said liquid medium in contact with organic, carbon-containing substance yielding hydroxyl ions in aqueous medium at elevated temperature;
    establishing said liquid medium at sufficiently elevated temperature to yield said hydroxyl ions;
    forming hydrous silicon oxide crystals with said ultrafine particulate carbon seeds in said dispersion;
    separating the resulting seeded crystals from said dispersion medium;
    admixing the resulting separated seeded crystals with metallic oxide; and
    calcining the resulting admixture to prepare an intimate mixture of metallic oxide with seeded silicon oxide crystals, which mixture is adapted for preparing metal silicide by elevated temperature reaction.

29. The method of claim 28, wherein said calcined mixture is reacted at elevated temperature thereby preparing metal silicide.

30. In the method of making a metal boride, carbide or nitride by first preparing metal oxide in combination with reducing agent, wherein a solution of a soluble, non-oxide of the metal is prepared in liquid medium and thereafter pH adjustment is used to precipitate metal oxide, the improvement comprising:
    seeding said solution with solid and insoluble, ultrafine carbon particulates which maintain solid integrity in the resulting dispersion;
    agitating the seeded dispersion;
    gradually adjusting the pH of liquid medium, while agitation continues, by bringing said liquid medium in contact with organic, carbon-containing substance yielding hydroxyl ions in aqueous medium at elevated temperature;

establishing said liquid medium at sufficiently elevated temperature to yield said hydroxyl ions;

forming hydrous metal oxide crystals with said ultrafine particulate carbon seeds in said dispersion; and separating the resulting seeded crystals from said dispersion medium.

* * * * *